US00RE37250E

(19) United States
(12) Reissued Patent
Kayanuma

(10) Patent Number: US RE37,250 E
(45) Date of Reissued Patent: Jul. 3, 2001

(54) APPARATUS FOR DETECTING MALFUNCTION IN EVAPORATED FUEL PURGE SYSTEM

(75) Inventor: Nobuaki Kayanuma, Gotenba (JP)

(73) Assignee: Toyota Jidosha Kabushiki Kaisha, Toyota (JP)

(21) Appl. No.: 08/071,836

(22) Filed: Jun. 2, 1993

Related U.S. Patent Documents

Reissue of:
(64) Patent No.: 5,143,035
Issued: Sep. 1, 1992
Appl. No.: 07/777,757
Filed: Oct. 10, 1991

(30) Foreign Application Priority Data

Oct. 15, 1990 (JP) ..... 2-275607

(51) Int. Cl.[7] ..... F02M 33/02; F02D 77/00
(52) U.S. Cl. ..... 123/198 D; 123/520
(58) Field of Search ..... 123/198 D, 520, 123/519, 518, 516, 479, 521

(56) References Cited

U.S. PATENT DOCUMENTS 4,630,581 * 12/1986 Shibata ..... 123/520
4,641,623 * 2/1987 Hamburg ..... 123/520
4,867,126 * 9/1989 Yonekawa ..... 123/198 D
4,962,944 * 10/1990 Uranishi ..... 123/198 D
5,085,194 * 2/1992 Kuroda ..... 123/198 D
5,085,197 * 2/1992 Mader ..... 123/520

FOREIGN PATENT DOCUMENTS

26754 * 2/1990 (JP) .
2-102360 4/1990 (JP) .
130255 * 5/1990 (JP) .

* cited by examiner

*Primary Examiner*—Carl S. Miller
(74) *Attorney, Agent, or Firm*—Kenyon & Kenyon

(57) ABSTRACT

A malfunction detection apparatus for detecting a malfunction in an evaporated fuel purge system for use in an internal combustion engine. The apparatus includes a vapor passage connecting a fuel tank to a canister for feeding fuel vapor from the fuel tank into the canister, a purge passage connecting the canister to an intake passage of the engine for feeding the fuel vapor adsorbed in an adsorbent in the canister into the intake passage, a purge control valve provided for controlling a flow of the adsorbed fuel vapor in the canister being fed into the intake passage, a pressure sensor provided for outputting a signal indicative of pressure in the vapor passage, and a malfunction detection part responsive to the signal outputted by the pressure sensor for detecting a malfunction in the evaporated fuel purge system.

10 Claims, 5 Drawing Sheets

INTERNAL COMBUSTION ENGINE
10
INTAKE PASSAGE 16
14
PURGE CONTROL VALVE 15
14
PURGE PASSAGE
MALFUNCTION DETECTION PART
18
17
PRESSURE SENSOR
CANISTER
13
12
12 VAPOR PASSAGE
FUEL TANK
11

APPARATUS FOR DETECTING MALFUNCTION IN EVAPORATED FUEL PURGE SYSTEM

Matter enclosed in heavy brackets [ ] appears in the original patent but forms no part of this reissue specification; matter printed in italics indicates the additions made by reissue.

BACKGROUND OF THE INVENTION (1) Field of the Invention

The present invention generally relates to a malfunction detection apparatus for an evaporated fuel purge system in an internal combustion engine, and more particularly to an apparatus for detecting a malfunction in an evaporated fuel purge system which is provided in an internal combustion engine for purging an evaporated fuel or fuel vapor into an intake system of the internal combustion engine under given operating conditions and for adsorbing the fuel vapor in an adsorbent in a canister, so that an air-fuel mixture is fed into a combustion chamber in the internal combustion engine.

(2) Description of the Related Art

An evaporated fuel purge system is provided in an internal combustion engine for adsorbing an evaporated fuel or fuel vapor, evaporated in a fuel tank, temporarily in an adsorbent in a canister so as to prevent the fuel vapor from escaping to the atmosphere, and for purging the adsorbed fuel vapor in the canister into an intake passage of the engine during engine operation. This evaporated fuel purge system usually includes a vapor passage connecting the fuel tank to the canister and a purge passage connecting the canister to the intake system of the engine. Also, a purge control valve is provided at an intermediate portion in the purge passage. However, in a case in which the vapor passage is damaged or a connecting pipe in the vapor passage is separated due to a certain problem, the fuel vapor may escape to the atmosphere from the evaporated fuel purge system.

A conventional malfunction detection apparatus for detecting a malfunction in the evaporated fuel purge system is known. For example, Japanese Laid-Open Patent Application No.2-130255 discloses such a malfunction detection apparatus. In this conventional malfunction detection apparatus, a pressure sensor is provided in the purge passage between the canister and the purge control valve for outputting a signal indicative of pressure in the purge passage, and a malfunction in the evaporated fuel purge system is detected by the malfunction detection apparatus in response to an output signal of the pressure sensor. The malfunctions thus detected include a clogging of an air inlet of the canister, a problem in the purge control valve, a clogging of the purge passage, and a pipe separation therein. However, pressure in the vapor passage between the fuel tank and the canister is not detected by such a conventional apparatus, and there is a difficulty in that a malfunction in the evaporated fuel purge system, due to a problem in the fuel tank or a clogging of the vapor passage or a connecting pipe separation therein, is not suitably detected.

SUMMARY OF THE INVENTION

Accordingly, it is a general object of the present invention to provide an improved malfunction detection apparatus in which the above described problems of the conventional apparatus are eliminated.

Another and more specific object of the present invention is to provide a malfunction detection apparatus which can suitably detect a malfunction in any part of the evaporated fuel purge system, including a fuel tank and a vapor passage. The above mentioned object of the present invention is achieved by an evaporated fuel purge system which comprises a fuel tank in which fuel is evaporated into a fuel vapor, a canister including an adsorbent for adsorbing the fuel vapor from the fuel tank, a vapor passage connecting the fuel tank to the canister for feeding the fuel vapor from the fuel tank into the canister, a purge passage connecting the canister to an intake passage of an internal combustion engine for feeding the adsorbed fuel vapor in the adsorbent in the canister into the intake passage, a purge control valve provided at an intermediate portion in the purge passage for controlling a flow of the adsorbed fuel vapor being fed by a vacuum pressure in the intake passage from the canister to the intake passage, a pressure sensor provided at an intermediate portion in the vapor passage for outputting a signal indicative of pressure in the vapor passage, and a malfunction detection part responsive to the signal from the pressure sensor for detecting a malfunction in the evaporated fuel purge system. According to the present invention, it is possible to detect suitably a malfunction in any part of the evaporated fuel purge system by making use of the pressure sensor provided at the intermediate portion in the vapor passage, thus increasing the reliability of an evaporated fuel purge system in an internal combustion engine.

Other objects and further features of the present invention will become more apparent from the following detailed description when read in conjunction with the accompanying drawings.

DESCRIPTION OF THE PREFERRED EMBODIMENT

Figure 1:
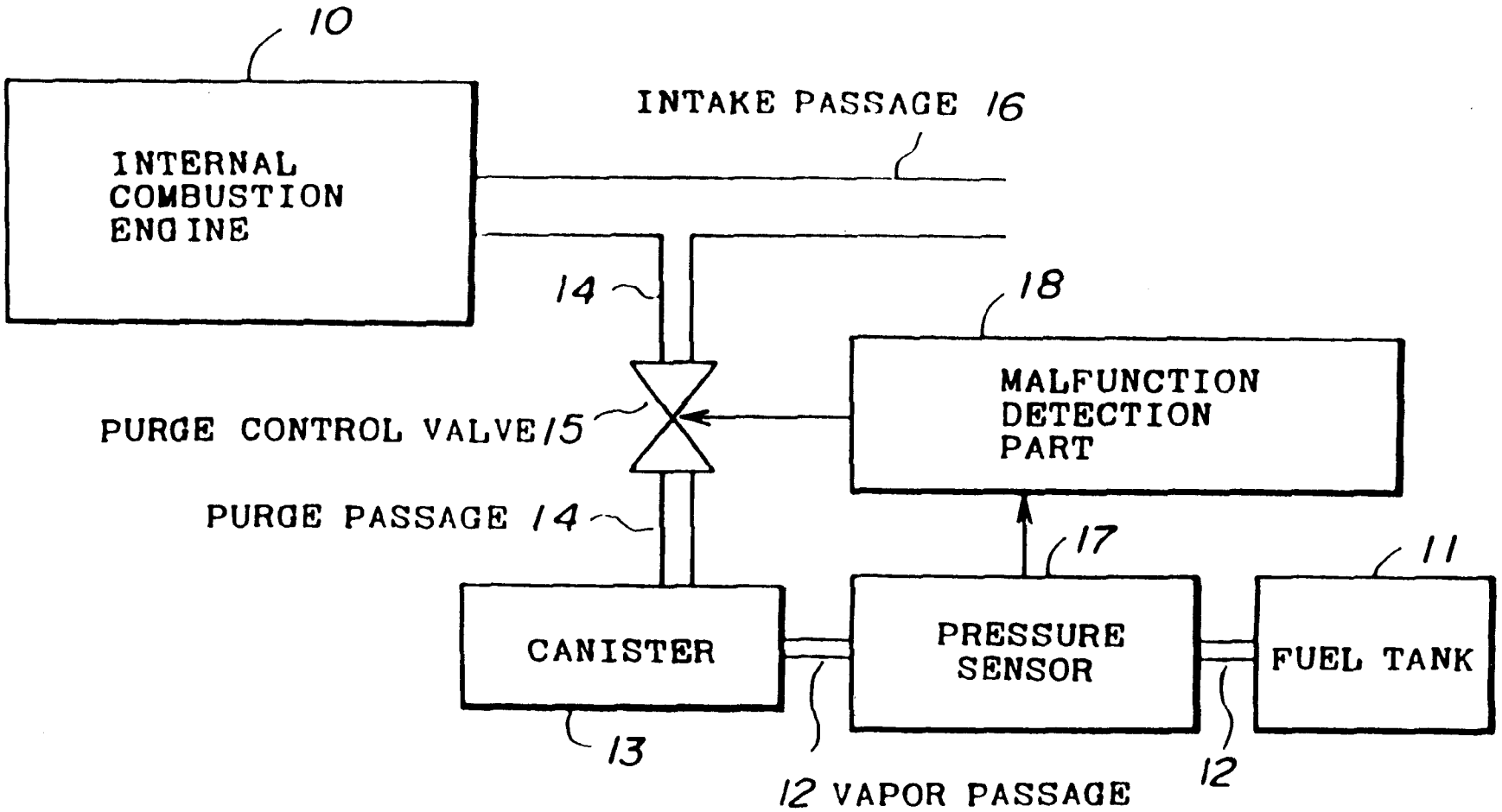
FIG. 1 is a block diagram for explaining the construction of a malfunction detection apparatus according to the present invention.

First, a description will be given of the construction of a malfunction detection apparatus according to the present invention, with reference to FIG.1. In FIG.1, an internal combustion engine 10 has an intake passage 16, and a fuel tank 11 communicates with a canister 13 through a vapor passage 12. The canister 13 communicates with the intake passage 16, leading to the internal combustion engine 10, through a purge passage 14. At an intermediate portion in the purge passage 14, a purge control valve 15 is provided. The evaporated fuel purge system to which the malfunction detection apparatus of the present invention is applied is thus constructed as described above. In the malfunction detection apparatus of the present invention, a pressure sensor 17 for generating a signal indicative of pressure in the fuel vapor passage 12 is provided at an intermediate portion in the vapor passage 12, and a malfunction detection part 18 is provided for detecting a malfunction in the evaporated fuel purge system in response to an output signal of the pressure sensor 17 indicative of pressure in the vapor passage 12.

Fuel vapor evaporated in the fuel tank 11 is fed into the canister 13 through the vapor passage 12 in which the pressure sensor 17 is provided, and this fuel vapor is adsorbed in an adsorbent, such as activated carbon, in the canister 13. When the fuel vapor is adsorbed in the canister 13, the pressure in the vapor passage is normally at a given positive pressure above the atmospheric pressure. Thus, in a case in which there is a malfunction in the fuel tank 11 or the vapor passage 12, the pressure in the vapor passage 12 does not reach the above mentioned positive pressure. In the meantime, when the purge control valve 15 is switched ON, the fuel vapor adsorbed in the adsorbent in the canister 13 is purged, due to a vacuum pressure (or a negative pressure below the atmospheric pressure) in the intake passage 16, into the intake passage 16 through the purge passage 14 in which the purge control valve 15 is provided. Pressure in the vapor passage 12 when the purge control valve 15 is switched ON is normally lower than pressure when the purge control valve is switched OFF, and this lower pressure is detected by the pressure sensor 17. However, in a case in which there is a malfunction in the purge passage 14, an output signal of the pressure sensor 17 does not change very much if the purge control valve 15 is switched from "ON" state to "OFF" state or vice versa.

Accordingly, the malfunction detection part 18 of the present invention can detect a malfunction in any part of the evaporated fuel purge system, including the fuel tank 11, the vapor passage 12 and the purge passage 14, on the basis of an output signal of the pressure sensor 17 in a normal condition, as well as a change in the output signal of the pressure sensor 17 when the purge control valve 15 is switched from "ON" state to "OFF" state or vice versa.

Figure 2:
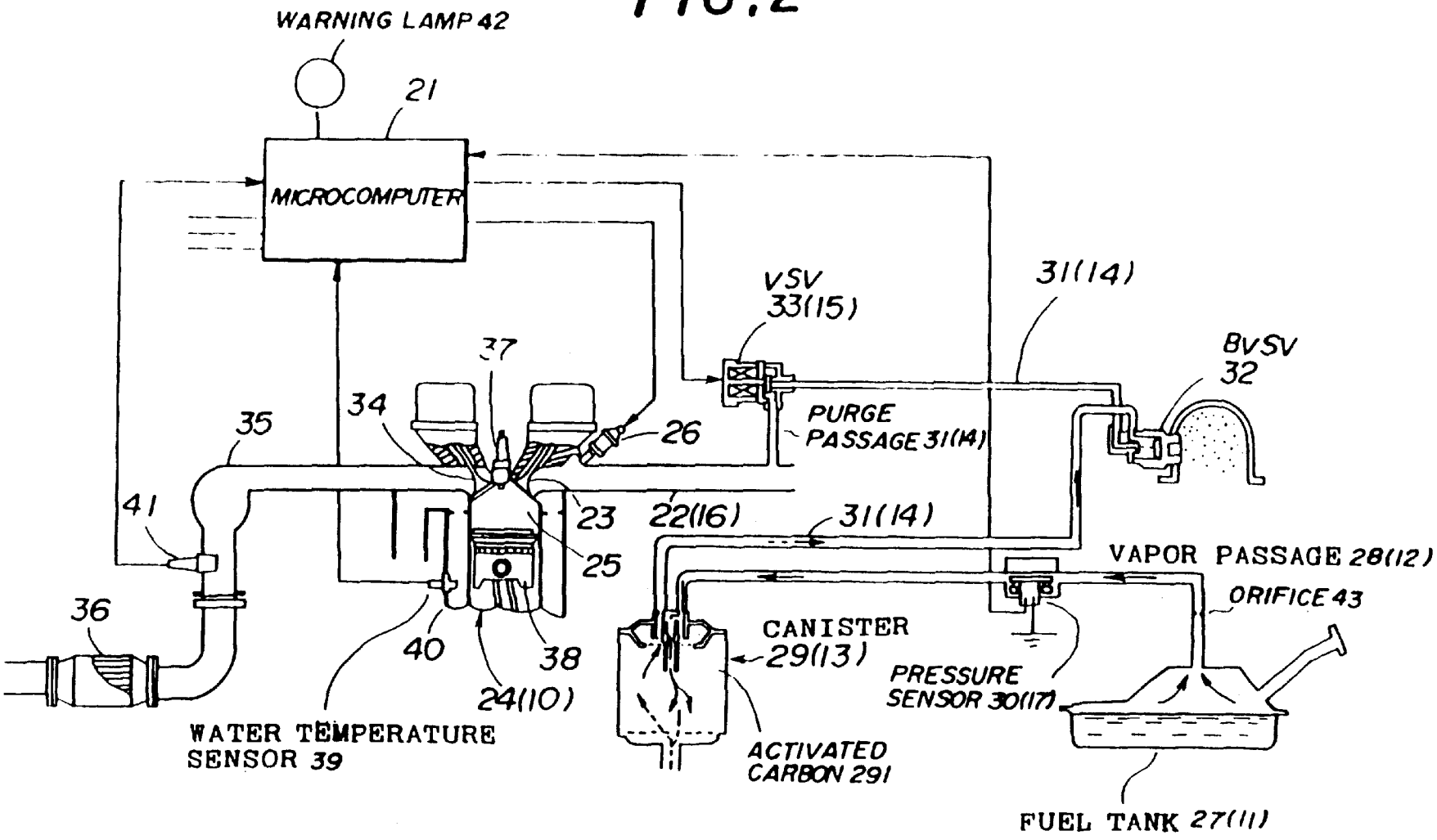
FIG. 2 is a view showing an embodiment of a malfunction detection apparatus according to the present invention.

FIG.2 shows an evaporated fuel purge system provided in an internal combustion engine to which a malfunction detection apparatus of the present invention may be applied. The internal combustion engine 10 in FIG.1 is, for example, a 4-cylinder, 4-cycle, spark-ignition-type internal combustion engine 24 shown in FIG.2, and the operations of the malfunction detection apparatus are controlled by a microcomputer 21 shown in FIG.2. In FIG.2, an intake manifold 22 (corresponding to the intake passage 16 in FIG.1) communicates with a combustion chamber 25 of the engine 24 (corresponding to the engine 10) through an intake valve 23. A fuel injector 26 is mounted on each of the four cylinders of the engine 24 in such a way that the fuel injector 26 partially projects into the intake manifold 22 leading to the combustion chamber 25. The fuel injector 26 inject fuel from a fuel tank 27 (corresponding to the fuel tank 11) to intake air passing through the intake manifold 22 for a fuel injection time period as instructed by the microcomputer 21. The fuel tank 27 communicates with a canister 29 (corresponding to the canister 13) through a vapor passage 28 (corresponding to the vapor passage 12). At an intermediate portion in the vapor passage 28, a pressure sensor 30 (corresponding to the pressure sensor 17) for generating a signal indicative of pressure in the vapor passage 28 is provided.

Figure 3:
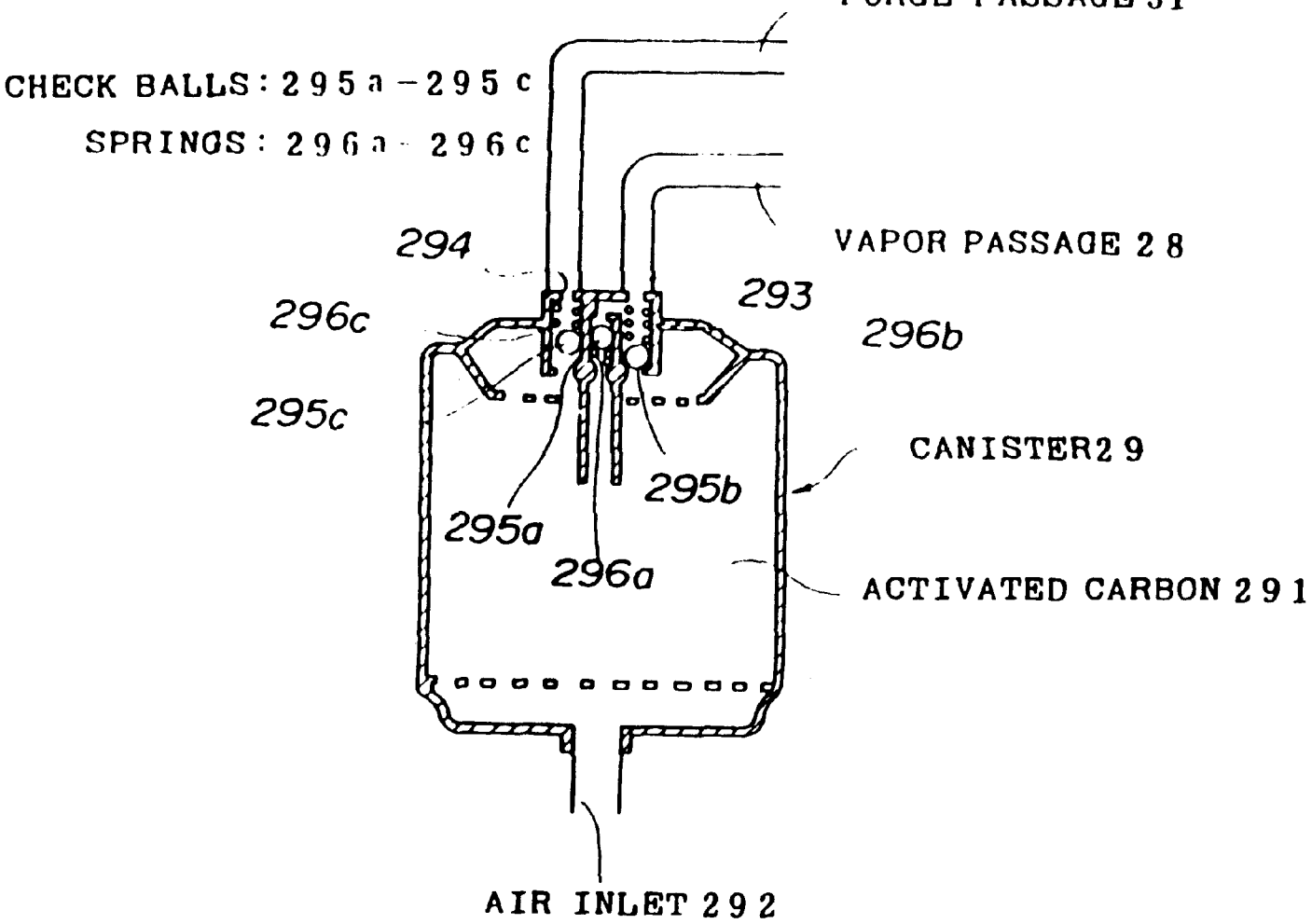
FIG. 3 is a sectional view showing a canister used in an evaporated fuel purge system to which the present invention is applied.

FIG.3 shows a detailed structure of the canister 29 shown in FIG.2. The canister 29 is filled with activated carbon 291 as the adsorbent, and an air inlet 292 is provided at the bottom center portion of the canister 29, the air inlet 292 communicating with the atmosphere. On the top of the canister 29, an inlet port 293 and an outlet port 294 are provided, the canister 29 communicating with the vapor passage 28 via the inlet port 293 and communicating with a purge passage 31 (corresponding to the passage 14) via the outlet port 294. Fuel vapor from the vapor passage 28 is fed to the canister 29 from the inlet port 293 through two channel portions, and in these channel portions check balls 295a, 295b are provided respectively. Also, two springs 296a, 296b are provided respectively in the two channel portions, the spring 296a actuates the check ball 295a upwardly in one channel portion while the spring 296b actuates the check ball 295b downwardly in the other channel portion. The fuel vapor adsorbed in the activated carbon 291 in the canister 29 is fed to the purge passage 31 from the outlet port 294 through a channel portion thereat, and in this channel portion at the outlet port 294 a check ball 295c and a spring 296c are provided, the spring 296c actuating the check ball 295c downwardly in the channel portion.

The canister 29, as shown in FIG.2, communicates with the intake manifold 22 through the purge passage 31. At intermediate portions in the purge passage 31, a bimetallic vacuum switching valve (BVSV) 32 and a vacuum switching valve (VSV) 33 are provided, and these valves are operated independently of each other to control the flow of fuel vapor purged into the intake manifold 22. The operation of the BVSV 32 is controlled by an expansive or compressive action of a bimetallic part thereof responsive to a temperature Tw of cooling water in the engine 24, so that the BVSV 32 is opened when the temperature Tw is higher than a predetermined temperature, while it is closed when the temperature Tw is lower than the predetermined temperature. The VSV 33 corresponds to the purge control valve 15 in FIG.1 and the operation of the VSV 33 is controlled by a control signal supplied by the microcomputer 21. The purge passage 31 from an outlet of the VSV 33 is connected to the intake manifold 22 at a portion in the vicinity of a throttle valve (not shown) or connected to a surge tank downstream of the throttle valve.

The internal combustion engine 24 includes an exhaust valve 34 and an exhaust manifold 35 so that exhaust gas from the combustion chamber 25 is fed into an exhaust passage leading to a catalytic converter 36 via the exhaust valve 34 and the exhaust manifold 35. A spark plug 37 is provided on the engine 24 for each of the engine cylinders in such a way that the spark plug 37 partially projects into the combustion chamber 25, and a piston 38 is provided for each of the engine cylinders so that the piston 38 is subjected to reciprocative up/down movements in each of the engine cylinders.

A water temperature sensor 39 is mounted on an engine block 40 of the engine 24 in such a way that the water temperature sensor 39 projects into a water jacket in which engine cooling water is contained. The water temperature sensor 39 supplies to the microcomputer 21 a signal indicative of a temperature of the engine cooling water in the water jacket. An oxygen sensor 41 is mounted on the exhaust manifold 35 in such a way that the oxygen sensor 41 partially projects into the exhaust manifold 35. The oxygen sensor 41 supplies to the microcomputer 21 a signal indicative of a concentration of oxygen in exhaust gas from the engine 24 before the exhaust gas enters the catalytic converter 36. And, a warning lamp 42 is provided for giving warning of a malfunction in the evaporated fuel purge system to a driver. The warning lamp 42 is turned ON by a control signal sent by the microcomputer 21 when the malfunction detection apparatus locates a malfunction in the system. In addition, an orifice 43 is formed in the vapor passage 28 at an outlet of the fuel tank 27 to reduce an influence of the internal pressure in the fuel tank 27 and enlarge the change in the pressure in the vapor passage 28. The orifice 43 at the outlet of the fuel tank 27 in the vapor passage 28 serves to increase the accuracy of the pressure detected by the pressure sensor 30.

In the evaporated fuel purge system shown in FIG.2, the fuel tank 27 is heated owing to solar energy and/or the heat of exhaust gas flowing through an exhaust passage provided in the vicinity of the fuel tank 27, and part of the fuel in the fuel tank 27 is evaporated so that fuel vapor is generated in the fuel tank 27. The fuel vapor evaporated in the fuel tank 27 is fed into the canister 29 through the vapor passage 28 and the pressure sensor 30. Generally, a positive pressure, which is above the atmospheric pressure, is predetermined so that, when the internal pressure of the fuel tank 27 is lower than the predetermined positive pressure, the inlet port 293 of the canister 29 shown in FIG.3 is closed by the check balls 295a, 295b so as to impede the generation of fuel vapor in the fuel tank 27. Once the fuel temperature is increased and the internal pressure of the fuel tank 27 is higher than the predetermined positive pressure, only the check ball 296a at the inlet port 293 of the canister 29 is lowered against the actuating force produced by the spring 296a, as shown in FIG.3, so that the fuel vapor from the fuel tank 27 enters the canister 29 through the inlet port 293 and is adsorbed in the activated carbon 291, thus preventing the fuel vapor from escaping to the atmosphere.

When the engine 24 is in a driving condition and the BVSV 32 and the VSV 33 are both in "ON" state (or, in a valve open condition), the check ball 295c at the outlet port 294 in FIG.3 is raised against the actuating force produced by the spring 296c, owing to a vacuum pressure in the intake manifold 22, so that external air is fed from the air inlet 292 into the canister 29 and the adsorbed fuel vapor is desorbed from the activated carbon 291. The fuel vapor from the outlet port 294 is fed into the intake manifold 22 through the purge passage 31, the BVSV 32 and the VSV 33. The activated carbon 291 is refreshed due to the above desorption and is in a waiting condition for subsequent vapor adsorption.

After the engine stops operating and a certain time elapses, the fuel in the fuel tank 27 is cooled and the internal space of the fuel tank 27 is at a vacuum pressure. The internal pressure in the fuel tank 27 may be excessively low. In this case, the check ball 295b at the inlet port 293 of the canister 29 is raised against the actuating force produced by the spring 296b due to the vacuum pressure in the fuel tank 27, so that external air is fed from the air inlet 292 into the canister 29 and the air is fed into the fuel tank 27 through the vapor passage 28, thus preventing the fuel tank 27 from being deformed or collapsed due to the low pressure in the fuel tank 27.

Figure 4:
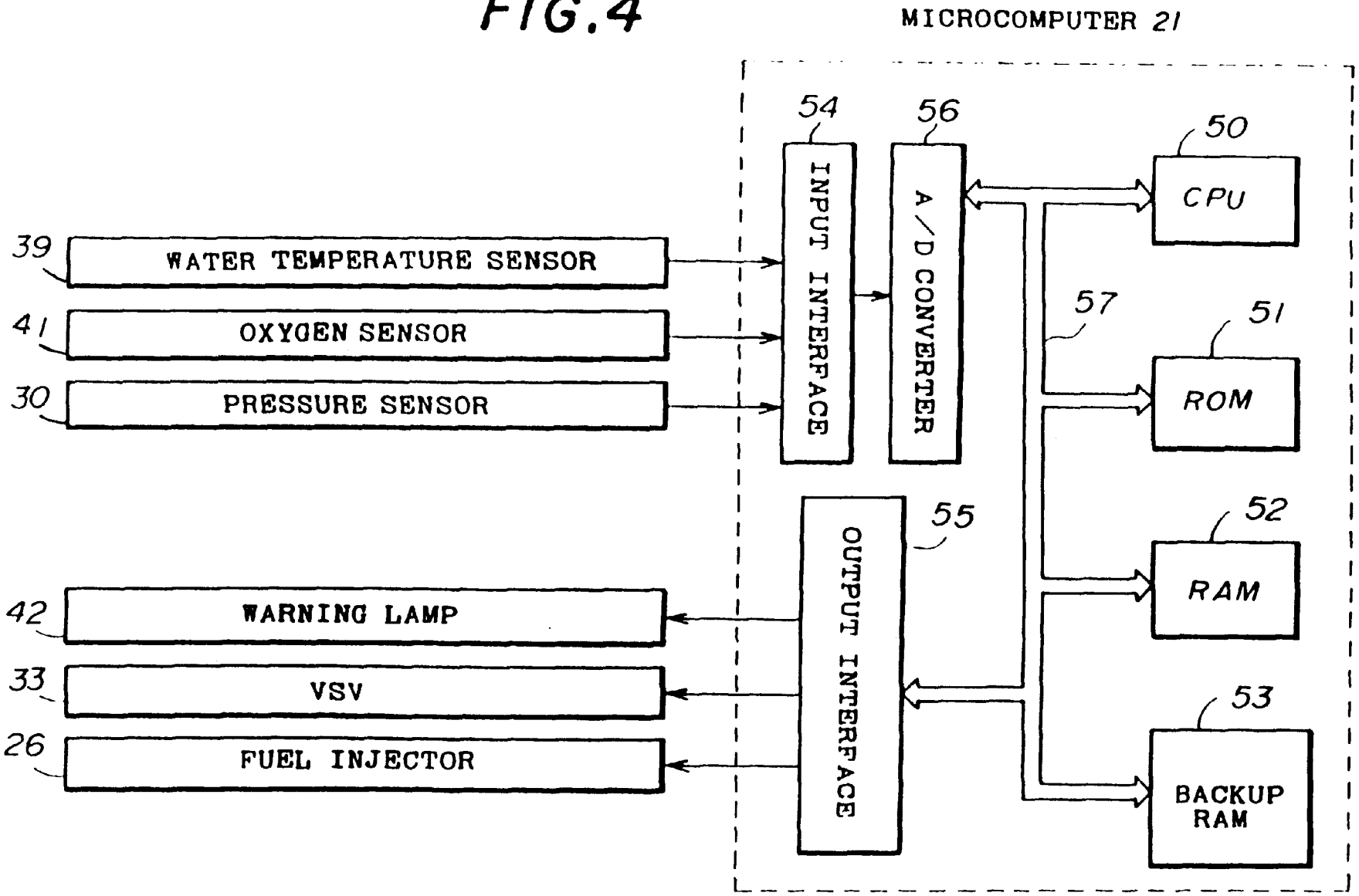
FIG. 4 is a block diagram for explaining the structure of a microcomputer used in the malfunction detection apparatus shown in FIG. 2.

FIG.4 shows a detailed structure of the microcomputer 21 shown in FIG.2. The microcomputer 21 controls the operations of component parts of the malfunction detection apparatus according to the present invention. In FIG.4, those parts which are the same as those corresponding parts shown in FIG.2 are designated by the same reference numerals, and a description thereof will be omitted. The microcomputer 21 shown in FIG.4 includes a CPU (central processing unit) 50, a ROM (read-only memory) 51 in which a control program for performing a malfunction detection procedure is stored, a RAM (random access memory) 52 which is used as a working area, a backup RAM 53 in which important stored data is retained after the engine stops operating also, an input interface circuit 54, an A/D (analog-to-digital) converter 56 with a multiplexer, an output interface circuit 55, and a bus 57 interconnecting the above components of the microcomputer 21.

The A/D converter 56 converts several input analog signals into digital signals and sends the respective digital signals to the CPU 50 via the bus 57. A signal indicative of the water temperature supplied by the water temperature sensor 39, a signal indicative of the oxygen concentration supplied by the oxygen sensor 41 and a signal indicative of the pressure in the vapor passage supplied by the pressure sensor 30 are each separately sent to the A/D converter 56 through the input interface circuit 54, and these signals are converted into the respective digital signals by the A/D converter 56, and then they are sequentially sent to the CPU 50 via the bus 57.

Control signals from the CPU 50, responsive to the input signals from the A/D converter 56, are sent sequentially to the output interface circuit 55 via the bus 57, and they are then sent from the output interface circuit 55 to the fuel injector 26, the VSV 33 and the warning lamp 42, respectively, so that the operations of the component parts are controlled by the control signals.

The above mentioned malfunction detecting function can be achieved by performing a malfunction detection procedure by means of the CPU 50 in accordance with the control program stored in the ROM 51. A description will now be given of the malfunction detection procedure which is performed in an embodiment of the present invention, with reference to FIG.5. The malfunction detection procedure shown in FIG.5 is periodically re-started and executed by the CPU 50 of the microcomputer 21 during operation.

Figure 5:
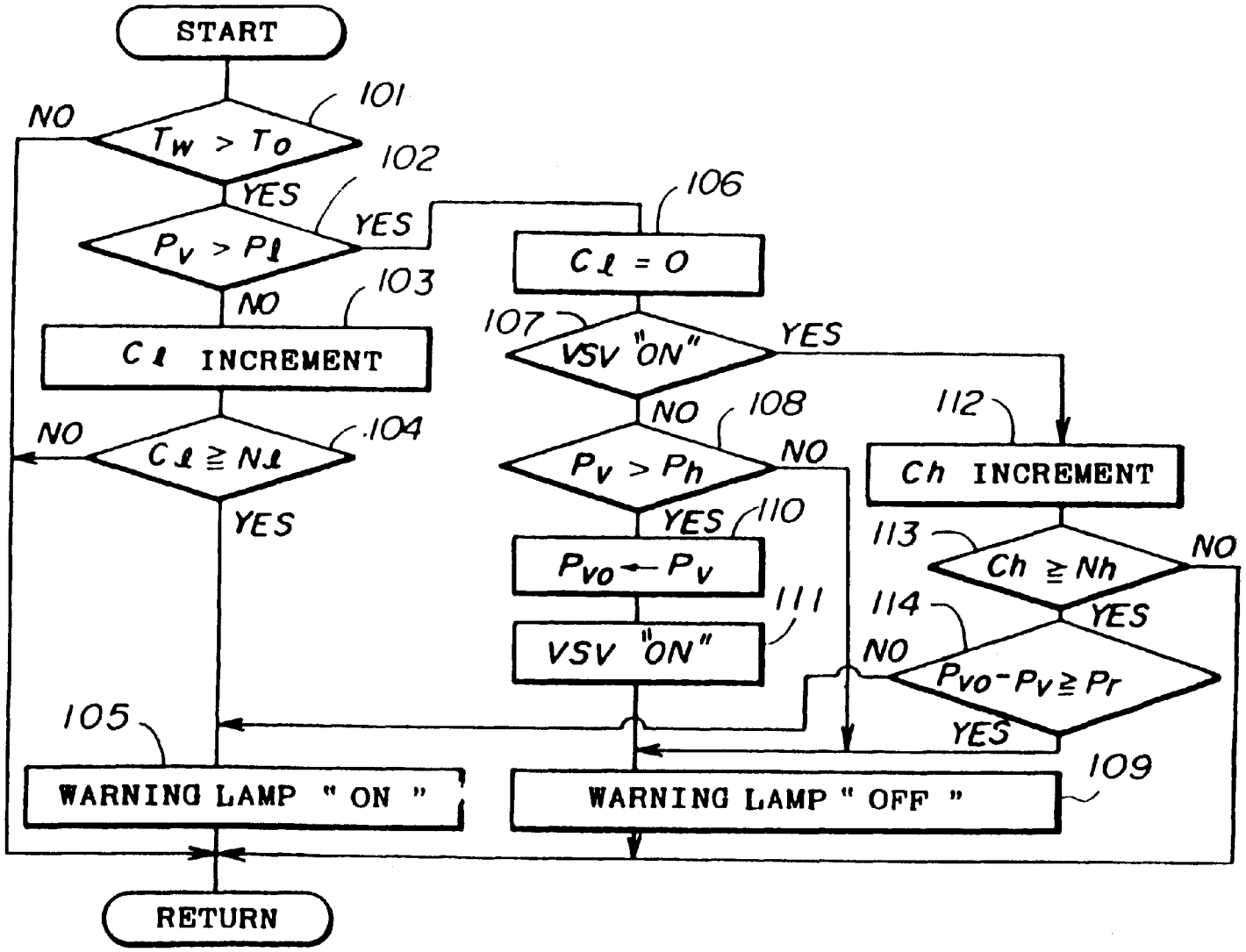
FIG. 5 is a flow chart for explaining a malfunction detection procedure which is performed in the embodiment of a malfunction detection apparatus according to the present invention.

In the flow chart shown in FIG.5, a step 101 determines whether the engine cooling water temperature Tw indicated by an output signal of the water temperature sensor 39 is higher than a predetermined temperature To (for example, 60 deg C). When the engine is in the idling condition and the engine operation has just been started, the indicated temperature Tw is lower than the temperature To. In such a case, therefore, the procedure is ended immediately after the step 101 is performed. Also, in this case, the BVSV 32 and the VSV 33 are both in "OFF" state or the closed condition, which condition is the same as when the engine is in the stop condition.

The water temperature Tw is increased as the time elapses, and the pressure in the vapor passage 28, indicated by an output signal of the pressure sensor 30, is also increased so that the pressure reaches a predetermined positive pressure (for example, +300 mmAq), which is above the atmospheric pressure, and such a pressure force becomes greater than the upward actuating force produced by the spring 296a. In the meantime, when the fuel vapor adsorbed in the canister 29 is purged into the intake manifold 22, the portion of the canister 29 at the inlet port 293 is at a negative pressure (for example, −100 mmAq). In this case, external air flows from the air inlet 292 through the activated carbon 291 into the purge passage 31, but the activated carbon 291 has a kind of air resistance and the pressure in the canister 29 at the inlet port 293 becomes a vacuum pressure. Thus, when the pressure in the vapor passage 28 indicated by an output signal of the pressure sensor 30 is higher than a pressure of 200 mmAq, the check ball 295a is lowered against the upward actuating force produced by the spring 296a and the inlet port 293 is opened.

After the engine starts operating and the idling thereof is completed, if the step 101 determines that the engine cooling water temperature Tw is higher than the predetermined temperature To, then it is assumed that the evaporated fuel purging requirements has been met, and a step 102 determines whether the pressure Pv indicated by the pressure sensor 30 is higher than a predetermined low pressure P1 (Pv>P1). The BVSV 32 is normally switched ON before the water temperature Tw indicated by the sensor 39 reaches the predetermined temperature To.

In cases in which there is a malfunction in the evaporated fuel purge system, such as a clogging of the fuel tank 27, a clogging of the vapor passage 28, or a pipe separation therein, the pressure Pv indicated by the pressure sensor 30 does not reach the predetermined low pressure P1, which is preset to, for example, +50 mmAq. If the step 102 determines that the indicated pressure pv is not higher than the predetermined low pressure P1 (Pv≦P1), then a step 103 increments a low-level count value C1 by one and a step 104 determines whether the low-level count value C1 is greater than a predetermined first time setting value N1. This first time setting value N1 is preset to a value indicating the elapsing time which is equal to, for example, 10 minutes. When the low-level count value C1 has not reached the first time setting value N1, the malfunction detection procedure is ended. In this manner, the steps 101 through 104 are repeatedly performed.

If the step 104 determines that the low-level count value C1 is greater than the first time setting value N1, then a step 105 switches ON the warning lamp 42 so as to give a warning of the malfunction to a vehicle driver. Since the indicated pressure Pv does not reach the predetermined low pressure P1 until more than 10 minutes have elapsed from when the engine starts operating, it is determined by the CPU 50 that there is a malfunction in the evaporated fuel purge system.

In the meantime, if the step 102 determines that the pressure Pv indicated by the pressure sensor 30 is greater than the predetermined low pressure P1, then a step 106 sets the low-level count value C1 to zero because it is determined that there is no malfunction in the system. A step 107 then checks whether the VSV 33 is switched ON or not. The BVSV 32 is already switched ON as described above, and the VSV 33 at this timing is normally switched OFF. A step 108 determines whether the pressure Pv indicated by the pressure sensor 30 is greater than a predetermined high pressure Ph. The predetermined high pressure Ph corresponds to a pressure indicated by the pressure sensor 30 when the check ball 295a is lowered and the inlet port 293 of the canister 29 is opened. In the present embodiment, the above high pressure Ph is preset to +250 mmAq, although variations of the pressure Pv indicated by the pressure sensor 30 are possible.

If the step 108 determines that the indicated pressure Pv has not reached the predetermined high pressure Ph (Pv<Ph), then a step 109 switches OFF the warning lamp 42. In this case, the internal pressure of the fuel tank 42 is still not at a sufficiently high pressure, and the malfunction detection procedure is not performed further so as to avoid making an erroneous malfunction detection.

On the other hand, if the step 108 determines that the indicated pressure Pv is higher than the predetermined high pressure Ph (Pv>Ph), then a step 110 sets the indicated pressure Pv to a previous pressure value Pvo and a step 111 switches ON the VSV 33 so that the fuel vapor is purged into the intake manifold 22. And, the step 109 switches OFF the warning lamp 42 and the malfunction detection procedure is ended.

The malfunction detection routine is subsequently re-started and the above steps 101, 102, 106 and 107 are performed again. It is then determined in the step 107 that the VSV 33 is switched ON, and a step 112 increments a high-level count value Ch by one and a step 113 determines whether the high-level count value Ch is greater than a predetermined second time setting value Nh. This second time setting value Nh is preset to a value indicating the elapsing time which is equal to, for example, 5 seconds. The second time setting value Nh is merely used for delaying the processing time so as to make the pressure in the vapor passage 28 stable after the VSV 33 is changed from "OFF" state to "ON" state.

If the step 113 determines that the high-level count value Ch is not greater than the predetermined second time setting value Nh, then the malfunction detection procedure is ended. After this, the malfunction detection routine is subsequently re-started and the steps 101, 102, 106, 107, 112 and 113 are performed again. It is then determined in the step 113 that the Ch is greater than the Nh. Next, a step 114 determines whether a difference between the previous pressure value Pvo when the VSV 33 is in "OFF" state and the current pressure value Pv indicated by an output signal of the pressure sensor 30 when the VSV 33 is in "ON" state is greater than a predetermined reference value Pr. In the present embodiment, this reference value Pr is preset to, for example, +50 mmAq, by considering the air resistance of the activated carbon 291 in the canister 29 to be equal to +100 mmAq. Although there are possibly variations of the pressure Pv indicated by the pressure sensor 30, the reference value Pr can be set to be approximately half the pressure value indicated by the air resistance of the absorbent in the canister.

The pressure Pvo indicated by the pressure sensor 30 when the VSV 3 is in "OFF" state will be reduced due to a negative pressure in the intake manifold 22 after the VSV is switched ON and the fuel vapor in the canister 29 is purged into the intake manifold 22, provided the canister 29, the purge passage 31, the BVSV 32 and the VSV 33 are operating normally. Therefore, if the step 114 determines that the pressure difference (Pvo–Pv) is greater than the predetermined reference value Pr, then it is determined by the CPU 50 that the evaporated fuel purge system is operating normally with no malfunction, and the step 109 switches OFF the warning lamp 42, thus ending the malfunction detection procedure.

On the other hand, if the step 114 determines that the pressure difference (Pvo–Pv) is not greater than the predetermined reference value Pr, then it is determined by the CPU 50 that the evaporated fuel purge system malfunctions, because the pressure in the vapor passage 28 (the pressure acting directly on the spring 296a) hardly changes when the VSV 33 is changed from "OFF" state to "ON" state. The malfunction which may be located in this case in the evaporated fuel purge system includes, for example, a clogging of the air inlet 292 of the canister 29, a clogging of the purge passage 31, a connecting pipe separation therein, a problem in the BVSV 32, or a problem in the VSV 33. Next, the step 105 switches ON the warning lamp 42 so as to give a warning of the malfunction to a vehicle driver, and the malfunction detection procedure is ended.

In the above described embodiment of the malfunction detection apparatus, a malfunction in the evaporated fuel purge system, including the purge passage 31 connecting the canister 29 to the intake manifold 22, the fuel tank 27 and the vapor passage 28 connecting the fuel tank to the canister, can be suitably detected by means of the pressure sensor 30.

As described above, according to the present invention, it is possible to detect suitably a malfunction in the evaporated fuel purge system including the fuel tank, the vapor passage and the purge passage, by making use of a pressure sensor provided at an intermediate portion in the vapor passage, thus increasing the reliability of an evaporated fuel purge system in an internal combustion engine.

Further, the present invention is not limited to the above described embodiment, and variations and modifications may be made without departing from the scope of the present invention.

What is claimed is:

1. An *apparatus for detecting a malfunction in an* evaporated fuel purge system [for use] *used* in an internal combustion engine, *said apparatus* comprising:

a fuel tank in which fuel is evaporated into a fuel vapor;

a canister including an adsorbent for adsorbing the fuel vapor from the fuel tank;

a vapor passage connecting said fuel tank to said canister for feeding the fuel vapor from said fuel tank into said canister;

a purge passage connecting said canister to an intake passage of the internal combustion engine for feeding the adsorbed fuel vapor in said adsorbent in said canister into said intake passage;

[purge control] valve means [provided at an intermediate portion in] *for closing* said purge passage [for controlling a flow] *to prohibit the feeding* of the [adsorbed] fuel vapor [being fed by a vacuum] *from said canister to said intake passage due to a negative* pressure in said intake passage from said canister to said intake passage;

a pressure sensor [provided at an intermediate portion] in said vapor passage for outputting a signal indicative of *a* pressure in said [vapor passage] *fuel purge system, wherein the purge system includes said fuel tank, said purge passage, said vapor passage and said canister*; and malfunction detection means [responsive to said signal outputted by said pressure sensor] for detecting *whether* a malfunction *has occurred* in said evaporated fuel purge system *in response to a pressure change corresponding to a difference between a first output signal of said pressure sensor at a first time while the purge passage is closed by said valve means and a second output signal of said pressure sensor a predetermined time after the first time,*

*wherein said malfunction detection means determines that a malfunction has occurred in said evaporated fuel purge system when the pressure change is less than a predetermined reference value.*

2. [The system as claimed in] *An apparatus according to* claim 1, further comprising warning lamp means for [giving a warning of the malfunction to] *informing* a *vehicle* driver *of the malfunction* when said malfunction is detected in said evaporated fuel pure system by said malfunction detection means.

3. The [system as claimed in] *apparatus according to* claim 1, wherein said [purge control] valve means includes a vacuum switching valve which is operated by a microcomputer and switched ON when the pressure in the vapor passage indicated by the signal outputted by said pressure sensor has reached a predetermined high pressure.

4. The [system as claimed in] *apparatus according to* claim 1, wherein said [purge control] valve means includes a vacuum switching valve operated by a microcomputer and a bimetal vacuum switching valve operated in response to a temperature of engine cooling water in the internal combustion engine.

5. [The system as claimed in] *An apparatus according to* claim 1, wherein said malfunction detection means determines that [there is] a malfunction *has occurred* in said [evaporated fuel purge] system when the pressure [in the vapor passage] indicated by the *output* signal [outputted by said] *of the* pressure sensor *when the malfunction detection procedure is performed* has not reached a predetermined [low pressure for more than a] *reference value greater than atmospheric pressure after said* predetermined first time period *has elapsed.*

6. [The system as claimed in claim 1, wherein said malfunction detection means determines that there is a malfunction in said evaporated fuel purge system when a change in the pressure in the vapor passage, indicated by the signal outputted by said pressure sensor, from an OFF state of said purge control valve to an ON state of said purge control valve means does not become greater than a predetermined reference value] *An apparatus for detecting a malfunction in an evaporated fuel purge system used in an internal combustion engine, said apparatus comprising:*

*a fuel tank in which fuel is evaporated into a fuel vapor;*

*a canister including an adsorbent for adsorbing the fuel vapor from the fuel tank;*

*a vapor passage connecting said fuel tank to said canister for feeding the fuel vapor from said fuel tank into said canister;*

*a purge passage connecting said canister to an intake passage of the internal combustion engine for feeding the adsorbed fuel vapor in said adsorbent in said canister into said intake passage;*

*valve means provided at an intermediate portion in said purge passage for controlling the flow of the adsorbed fuel vapor fed due to a negative pressure in said intake passage from said canister to said intake passage;*

*a pressure sensor for outputting a signal indicative of a pressure in said fuel purge system, wherein the purge system includes said fuel tank, said purge passage, said vapor passage and said canister; and*

*malfunction detection means for detecting whether or not a malfunction has occurred in said evaporated fuel purge system by detecting a pressure difference between a first output signal of said pressure sensor before the valve means is switched from a closed state to an open state and a second output signal of said pressure sensor a predetermined time after the valve means has been switched from the closed state to the open state.*

7. [The system as claimed in] *An apparatus according to* claim 6, wherein [said determination is made by] said malfunction detection means *determines that a malfunction has occurred in said system when the value of the pressure difference indicated by the output signal of the pressure sensor has not reached a predetermined reference value* after [said purge control means is switch ON and a] *the* predetermined [second] time period [elapses] *has elapsed.*

8. The [system as claimed in] *apparatus according to* claim 1, wherein said canister includes a check valve means which is actuated by a spring so as to close an inlet port of said canister communicating with the vapor passage leading to the fuel tank, said inlet port being opened against the actuating force produced by said spring when the pressure in the vapor passage is lower than a predetermined pressure, thus allowing external air to be fed into the vapor passage from an air inlet port provided at a bottom portion of said canister.

*9. An apparatus according to claim 7, wherein the value of the pressure difference is indicated as a difference*

*between pressures respectively indicated by the output signal of the pressure sensor when the valve means is switched ON and when the valve means is switched OFF after the predetermined time period has elapsed.*

*10. An apparatus according to claim 6, further comprising warning lamp means for informing a vehicle driver of the malfunction when said malfunction is detected in said evaporated fuel purge system by said malfunction detection means.*

* * * * *

UNITED STATES PATENT AND TRADEMARK OFFICE

CERTIFICATE OF CORRECTION

PATENT NO. : RE 37,250 E
DATED : July 3, 2001
INVENTOR(S) : Nobuaki Kayanuma

It is certified that error appears in the above-identified patent and that said Letters Patent is hereby corrected as shown below:

Column 9,
Line 29, before “from” insert -- [ --.
Line 30, change “sage;” to -- sage]; --.
Line 31, change “portion]” to -- portion --.
Line 32, change “passage” to -- passage] --.
Line 54, change “pure” to -- purge --.

Column 10,
Line 32, change “controlling the flow” to -- controlling a flow --.
Line 33, after “fuel vapor” insert -- being --.

Signed and Sealed this

Twenty-second Day of April, 2003

JAMES E. ROGAN
*Director of the United States Patent and Trademark Office*